United States Patent
Arimilli et al.

(10) Patent No.: US 6,622,222 B2
(45) Date of Patent: Sep. 16, 2003

(54) SEQUENCING DATA ON A SHARED DATA BUS VIA A MEMORY BUFFER TO PREVENT DATA OVERLAP DURING MULTIPLE MEMORY READ OPERATIONS

(75) Inventors: Ravi Kumar Arimilli, Austin, TX (US); James Stephen Fields, Jr., Austin, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 09/843,071

(22) Filed: Apr. 26, 2001

(65) Prior Publication Data

US 2002/0161979 A1 Oct. 31, 2002

(51) Int. Cl.[7] .............................................. G06F 13/00
(52) U.S. Cl. ........................... 711/154; 710/52; 710/58; 711/151; 711/158; 711/147
(58) Field of Search ............................. 710/52, 53, 58; 711/105, 147, 151, 154, 158

(56) References Cited

U.S. PATENT DOCUMENTS

| | | | | |
|---|---|---|---|---|
| 4,887,267 A | * | 12/1989 | Kanuma | |
| 5,517,129 A | * | 5/1996 | Matsui | 326/27 |
| 5,568,614 A | * | 10/1996 | Mendelson et al. | 709/231 |
| 5,832,215 A | * | 11/1998 | Kato et al. | 709/230 |
| 5,892,981 A | * | 4/1999 | Wiggers | 710/58 |
| 6,161,169 A | * | 12/2000 | Cheng | 711/150 |
| 6,404,768 B1 | * | 6/2002 | Basak et al. | 370/395.7 |

* cited by examiner

*Primary Examiner*—Than Nguyen
(74) *Attorney, Agent, or Firm*—Casimer K. Salys; Bracewell & Patterson, L.L.P.

(57) ABSTRACT

Disclosed is a method and memory subsystem that allows for speculative issuance of reads to a DRAM array to provide efficient utilization of the data out bus and faster read response for accesses to a single DRAM array. Two read requests are issued simultaneously to a first and second DRAM in the memory subsystem, respectively. Data issued from the first DRAM is immediately placed on the data out bus, while data issued from the second DRAM is held in an associated buffer. The processor or memory controller then generates a release signal if the second read is not speculative or is correctly speculated. The release signal is sent to the second DRAM after the first issued data is placed on the bus. The release signal releases the data held in the buffer associated with the second DRAM from the buffer to the data out bus. Because the data has already been issued when the release signal is received, no loss of time is incurred in issuing the data from the DRAM and only a small clock cycle delay occurs between the first issued data and the second issued data on the data out bus.

33 Claims, 6 Drawing Sheets

| 0 | 1 | 2 | 3 | 4 | 5 | 6 | 7 | 8 | 9 | 0 | 1 | 2 | 3 | 4 | 5 |
|---|---|---|---|---|---|---|---|---|---|---|---|---|---|---|---|
| RD A | | | RD B | D | D | | | | | | | | | | |
| | | | | | | | D | D | | | | | | | |
| | | | | D | D | | | | | | | | | | |
| | | | | | | | | | | RD B+1 | | | | | |
| | | | | | | | D | D | | | | | | D | D |
| | | | | | | | | | | | | | | D | D |

| 0 | 1 | 2 | 3 | 4 | 5 | 6 | 7 | 8 | 9 | 0 | 1 | 2 | 3 | 4 | 5 |
|---|---|---|---|---|---|---|---|---|---|---|---|---|---|---|---|
| RD A | | | | | D | | | | | | | | | | |
| RD B | | | | D | D | | | | | | | | | | |
| | | | | | | RD B+1 | | | | | | | | | |
| | | | | D | | | D | D | | D | D | | | | |
| | | | | | | | | | | D | D | | | | |

513 ← 503 → 512

SEQUENCING DATA ON A SHARED DATA BUS VIA A MEMORY BUFFER TO PREVENT DATA OVERLAP DURING MULTIPLE MEMORY READ OPERATIONS

BACKGROUND OF THE INVENTION

1. Technical Field

The present invention generally relates to computer memory subsystems, and more particularly to a Dynamic Random Access Memory (DRAM) subsystem. Still more particularly, the present invention relates to a DRAM subsystem that supports speculative reads for efficient utilization of the data out bus.

2. Description of the Related Art

DRAM subsystems are well known in the art. A typical DRAM cell uses the gate capacitance of one or more field-effect transistors to provide the storage of a binary state. The charge on this capacitor will eventually leak and the DRAM cell may change state, causing an incorrect bit to be set or reset in memory. This problem is typically solved by a refresh scheme, which allows the gate of the field-effect transistors to be recharged according to the value stored in the cell, before sufficient discharge has occurred to cause an error.

The typical DRAM is formed by thousands of individual memory cells arranged in a matrix-like configuration. Each DRAM cell includes a capacitor, which is electrically charged or discharged in a "write" operation. The charge establishes a voltage on the capacitor, and the level of the voltage represents a data bit. The data bit represented by the capacitor charge is determined by comparing the capacitor voltage to a threshold reference. Due to the loss of charge associated with the capacitor, a DRAM typically requires its storage cells to be refreshed after each use.

The memory cells of the DRAM matrix are addressed by signals supplied on word lines and bit lines. The word lines extend in a horizontal reference direction in the matrix and connect to the memory cells in the horizontal rows and thus intersect vertical columns of memory cells in the matrix. The bit lines extend in a vertical reference direction in the matrix and connect to the memory cells in vertical columns and thus intersect horizontal rows of cells. By energizing a selected word line, the voltage from the memory cells in the horizontal row corresponding to the selected word line are presented on the bit lines extending from each of the cells.

The DRAM memory array is usually divided into one or more segments, and each of the segments is further divided into bit blocks. Each bit block has a plurality of memory cells, and those memory cells are organized into rows and columns in a matrix. Individual words are selected by addressing the DRAM segments, selecting individual columns in the bit blocks, and selecting the desired word line.

The individual DRAM components are typically four bits wide and are assembled in parallel in a row to create wider DRAM systems. For example, 32 DRAM's may be assembled to form a 16 byte wide data bus. The DRAM system would consist of multiple groups of 32 DRAMS that had a common data bus but each having its own unique address bus. In operation, when a read is issued by the processor, the command will be issued on the address bus to a specific DRAM group and the data is provided to the shared data out bus.

A single data out bus provides the data out for all DRAMs in the DRAM system, while each DRAM has its own address bus. In operation, when a read command is issued by the processor, the command is issued on the address bus to a specific DRAM array and the data is provided to the shared data out bus. If multiple reads are issued, however, with present memory devices, there is no control provided to allow the data to be scheduled to the common data bus, which ultimately leads to situations where there are collisions on the data bus.

During read operations from different DRAMs, the data issued from one DRAM must not run into the data issued from another DRAM on the data out bus. Additionally, some space is needed between accesses to different groups of DRAMs on a common data bus to prevent switching noise.

In general there are three stages in a read access of a group of DRAM'S. The first stage is the access stage, during this stage the address is sent to the DRAM's and the DRAM array is accessed. This stage takes a number of cycles depending on the type and speed of the DRAM's themselves. The second stage is the data transfer which will be some number of cycles depending on the burst length that is requested. The third stage is the precharge stage, in this stage the DRAM is recovering from the access and returning to a state where another access may be initiated. The length of this stage is also dependent on the DRAM type and speed. In general multiple accesses to the same group of DRAMs will result in large gaps between the data packets. To increase data bus utilization multiple groups of DRAMs will be accessed in a overlapping fashion so that the resulting data packets will fill the gaps on the data bus.

Due to the requirement that the reads be scheduled to avoid collisions on the common data bus, the memory controller will have to delay read commands that it received in order to line up the data transfer to a hole on the common data bus. By delaying the read command, the memory controller effectively increases the amount of time that the DRAM group is busy for a given read access, thereby lowering the efficiency of the memory subsystem. If the DRAM access could be started as soon as the memory controller had the command and the data transfer delayed until there was space for it on the bus, the DRAM cycle for the read could be completed earlier, and the group of DRAM's would be available sooner for the next read request.

Another related problem with DRAM operations is that often a read request is issued speculatively and the processor may later resolve that the read should not be completed or that the read address is incorrect. With current memory systems, once a read has been issued by the processor, there is no way for the processor to prevent the data from being issued. However, as described above, the data is usually not issued until a significant number of clock cycles has elapsed after the read request is sent down the processor pipeline. Given the present inefficient utilization of the data out bus, the issuing of data on the data out bus from a read request that is determined to be incorrectly issued prior to placing the data on the bus is a waste of bus resources. There is presently a read command STOP.for SDRAM components; however, there is no mechanism by which a DRAM issued read can be halted after it has been sent by the memory controller.

The present invention recognized that it would be desirable to have a method and DRAM system that provides efficient utilization of the data out bus by allowing controlled speculative reads of data from a DRAM subsystem that enables maximum utilization of the data out bus. A method by which the effects of the delay in data issuance on the data bus that is associated with the refresh operation of a DRAM is substantially reduced would be a welcomed improvement. These and other benefits are provided in the present invention.

SUMMARY OF THE INVENTION

Disclosed is a method and memory subsystem that allows for speculative issuance of reads to a DRAM array to provide efficient utilization of the data out bus and faster read response for accesses to a single DRAM array. Two read requests are issued simultaneously to a first and second DRAM in the memory subsystem, respectively. Data issued from the first DRAM is immediately placed on the data out bus, while data issued from the second DRAM is held in an associated buffer. The processor or memory controller then generates a release signal if the second read is not speculative or is correctly speculated. The release signal is sent to the second DRAM after the first issued data is placed on the bus. The release signal releases the data held in the buffer associated with the second DRAM from the buffer to the data out bus. Because the data has already been issued when the release signal is received, no loss of time is incurred in issuing the data from the DRAM and only a small clock cycle delay occurs between the first issued data and the second issued data on the data out bus.

If the second read request was incorrectly speculated, then no release signal is transmitted to the second DRAM. A next correct read is issued. When a next read is made to the second DRAM, the buffer is overwritten with data issued from the later read command, and the data issued by the incorrectly speculated read is never placed on the data out bus. Additionally, by issuing the second read simultaneously with the first, the second DRAM begins its precharge operation sooner and is ready to process a next read request soon after the first read request issues data on the data out bus. Substantially time savings is realized in the subsequent issuance of data from the DRAMs, and a more efficient utilization of the data out bus is realized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
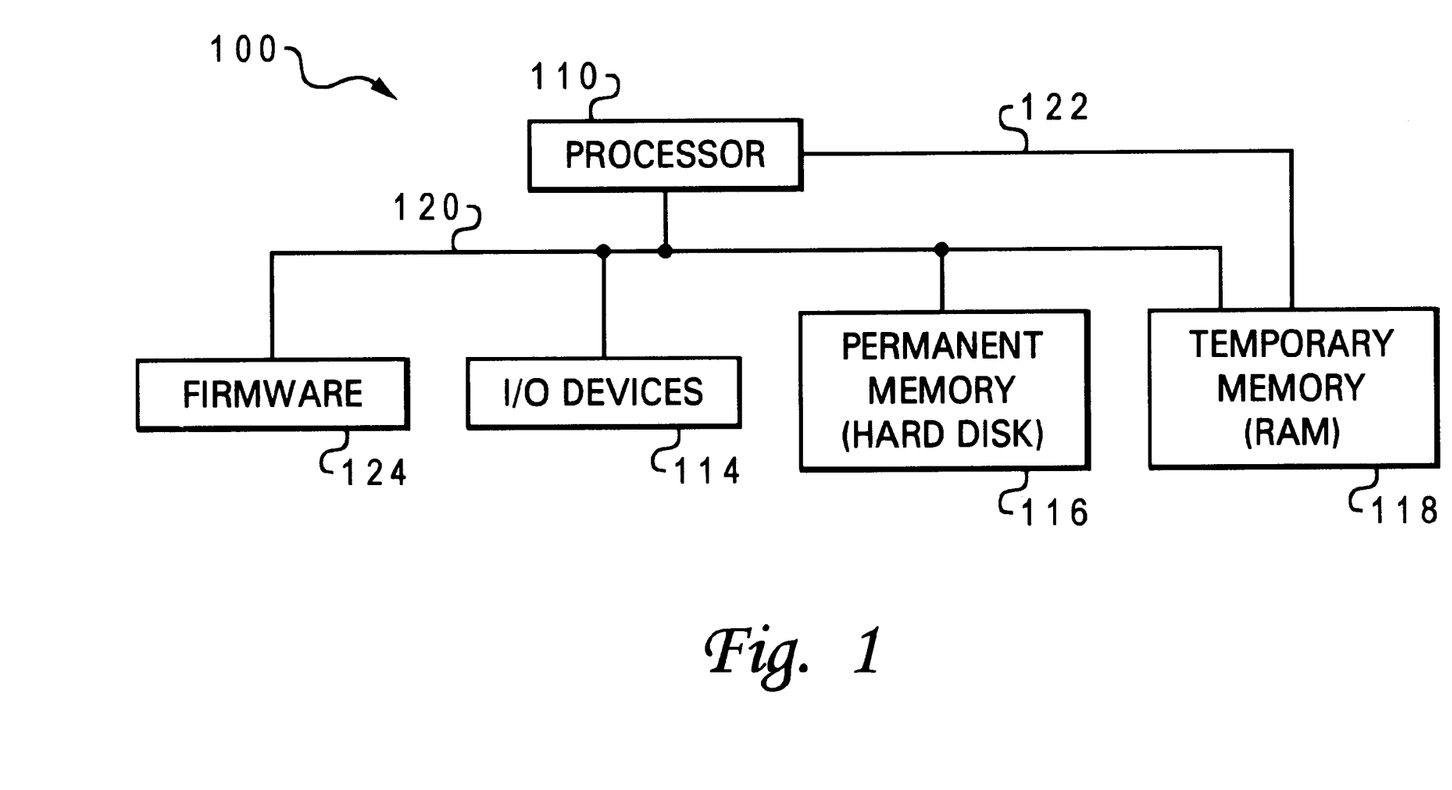
FIG. 1 depicts a block diagram of major components of a data processing system, in which a preferred embodiment of the present invention may be implemented.

With reference now to the figures and in particular with reference to FIG. 1, there is illustrated a high level block diagram of the major component parts of a data processing system that may be utilized to implement the various features of the present invention. Data processing system 100 comprises a Central Processing Unit (CPU) 110. CPU 110 is coupled to permanent (non-volatile) memory 116, peripheral input/output (I/O) devices 114, firmware 124, and temporary memory (DRAM) 118 via interconnect 120. CPU 110 is further directly coupled to DRAM 118 via memory interconnect 122.

Figure 2:
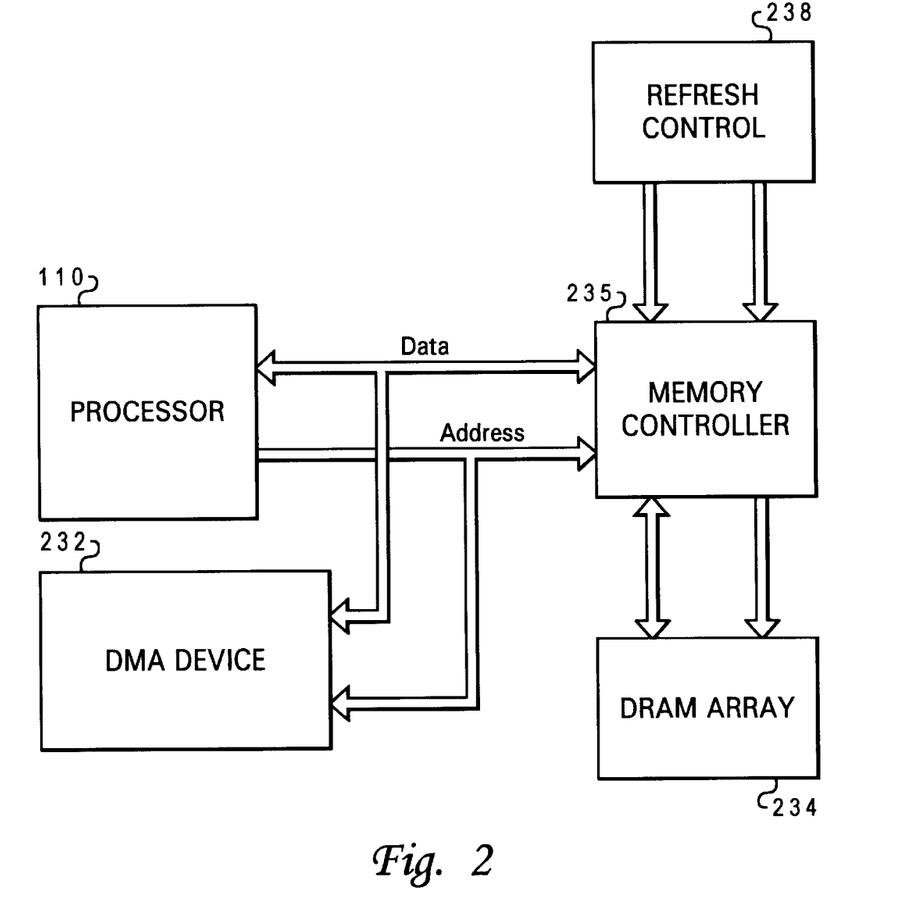
FIG. 2 depicts a block diagram of a memory subsystem within the data processing system of FIG. 1 within which a preferred embodiment of the present invention may be implemented.

The present invention is preferably implemented in a DRAM subsystem as illustrated in FIG. 2. The DRAM subsystem includes a DRAM array 234, which may be synonymous with temporary memory 118 of FIG. 1. DRAM array 234 is coupled to a memory controller 235, which controls all accesses, both read and write, to DRAM array 234. Requests for reads and writes are received by memory controller 235 from processor 110 as read and write commands, respectively.

Refresh Control 238 provides refresh requests to the DRAM array 234. Processor 110 and Direct Memory Access (DMA) Device 232, provide requests and data for write operations to memory controller 235. Refresh control 238 provides refresh requests to memory controller 235. Memory controller 235 accesses DRAM array 234 and provides data to processor 110 and DMA Device 232 on read operations. DRAM Array 234, is refreshed by the action of the control logic through Memory Controller 235, which will further generate CAS (Column Address Select) and/or RAS signals (Row Address Select) signals within the DRAM array 234, depending on the particular refresh technique that the DRAM array 234 requires.

These signals are well known names for signals within the art of DRAM's, but should not be construed to limit the application of these circuits and techniques. DRAM array 234 can be memory that is external to the processor integrated circuit or can constitute DRAM within a processor such as L1 or L2 cache memory provided in a microprocessor or other program execution device.

The preferred embodiment of the invention provides a method for controlled issuance of read data from the DRAM subsystem on the data out bus and speculative read operations on DRAMs as illustrated in FIG. 3 and described below. The invention provides a mechanism for pre-fetching read operations to DRAM to allow early read access of read data that has not passed system snoop protocols without reducing the effective utilization of the memory data bus. The invention finds applicability with large memory subsystems with multiple address buses but a common data bus as illustrated in FIG. 3.

Figure 3A:
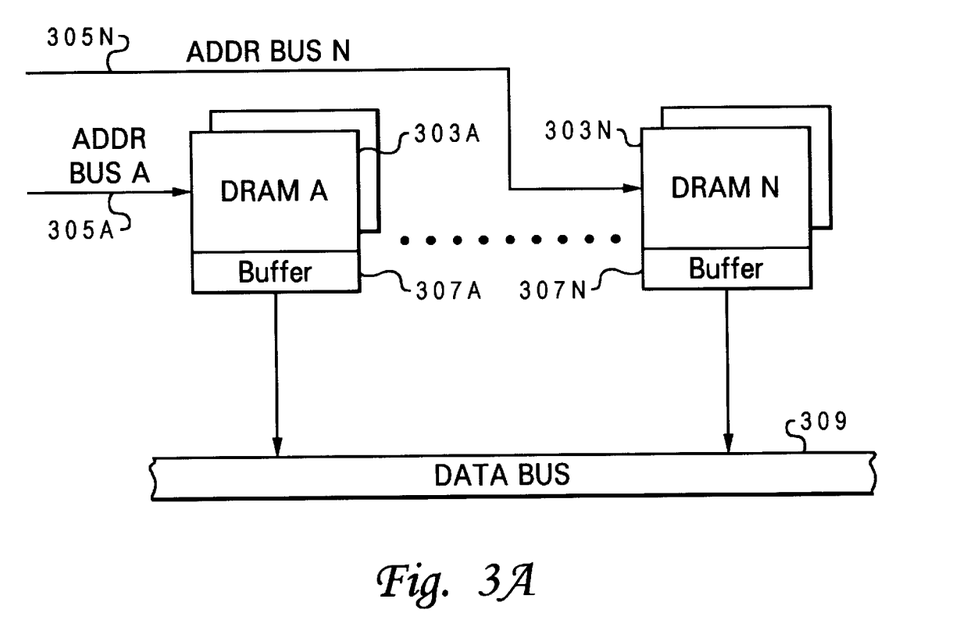
FIGS. 3A and 3B illustrate two embodiments of the internal makeup of a memory array with a buffer according to the features of the present invention.
Figure 3B:
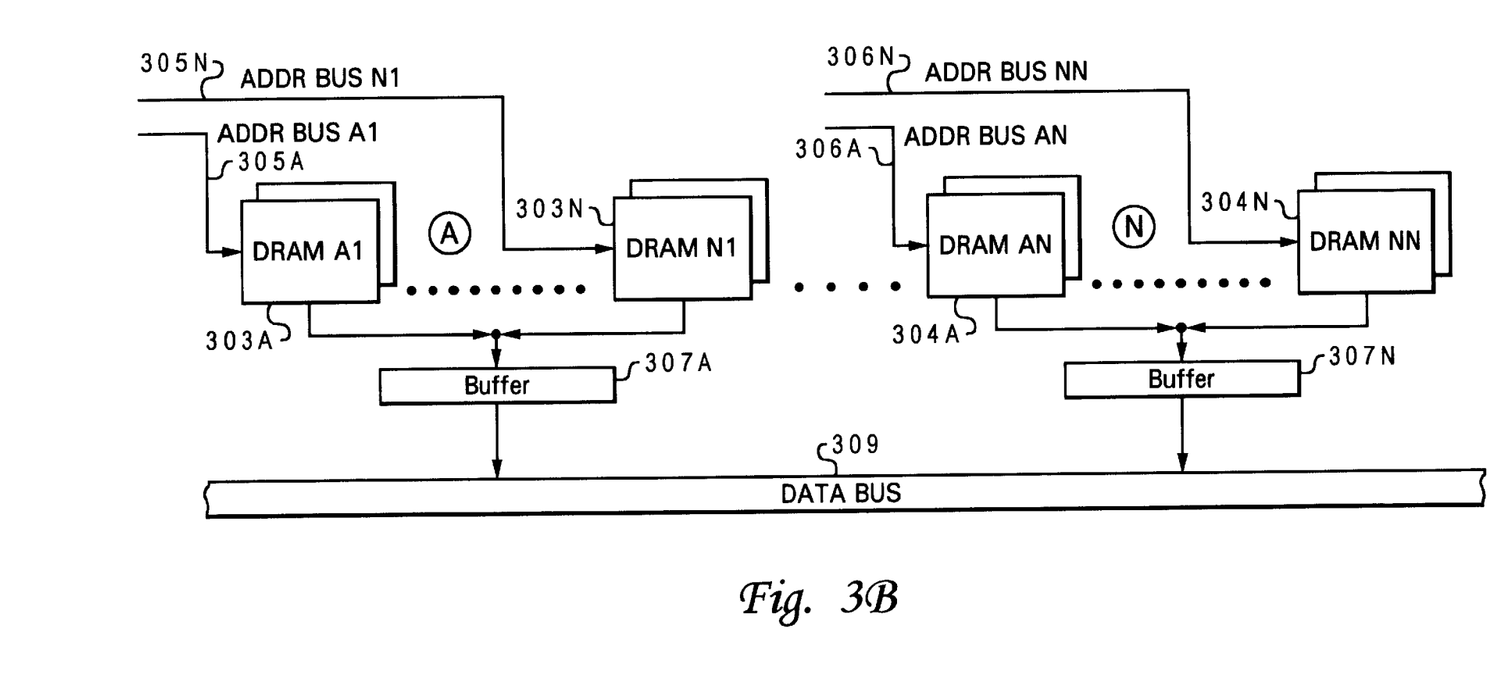

FIGS. 3A and 3B are block diagrams illustrating two embodiments of the parallel banks of DRAMs within a DRAM subsystem as provided in FIG. 2 in accordance with the present invention. As shown in FIG. 3A, a number of DRAM components 303A–303N are lined in parallel, each having a separate address bus 305A–305N. In the illustrated embodiment, DRAM components 303A–303N each comprise a buffer 307A–307N that is in turn connected to a shared data out bus 309. Buffer 307A–307N may be a latch capable of storing one line of data from its respective DRAM component 303A–303N. Each address bus 305A–305N is capable of receiving/transmitting both a read request that comprises an associated address and a release signal that controls the release of data from the respective buffer 307A–307N. According to one embodiment, read request also comprises a hold bit which may be set by the memory controller to indicate that data issued by the read request is to be held in the respective buffer 307A–307N until a release signal is transmitted to the DRAM component 303A–303N.

Although illustrated as an associated component part of the DRAM component 303A–303N, the buffer 307A–307N may be a separate component. Also, the buffer 307A–307N may be shared among several DRAM components (illustrated in FIG. 3B). With a shared-buffer configuration, the invention provides that the second set of issued data is loaded into the shared buffer 307A–307N and the memory controller may signal the shared buffer 307A–307N directly (i.e., not the individual DRAM component) to release the data to the data out bus. FIG. 3B further illustrates multiple banks of memory components. Bank A (DRAM A1 303A to DRAM N1 303N and corresponding address buses 305A–305N) to Bank N (DRAM AN 304A to DRAM NN 304N and corresponding address buses 306A–306N) have a shared buffer configuration with a single shared buffer 307A–307N connecting the data outputs from each bank of DRAMs, respectively.

The invention thus modifies and/or adds a command to the DRAM address bus that initiates a read of data from the DRAM component but holds the issued data temporarily in a buffer until another command is issued to transfer the data from the buffer to the data bus. In one embodiment, the buffer is implemented as a simple latch, which opens and closes when a specific command is received. Thus, the hold command may comprise a single bit issued to the latch to close the latch and the subsequent release signal may also be a single bit issued by the memory controller that opens the latch. In the shared-buffer embodiment, the signals may be transmitted directly to the buffer via a signal line connecting the buffer to the memory controller or the DRAM component's address bus. The utilization of these commands allows the memory controller to issue multiple successive DRAM read commands to memory, prior to the resolution of speculative read or system snoop operations, and then basically cancel the commands by not sending a signal to transfer the data from the buffer to the memory data bus. The memory controller may also overwrite the buffer in the DRAM with the next read command.

In the preferred embodiment, speculative or simultaneously release data is held in the buffer until the memory controller decides to released the data by sending a release signal. In another embodiment, data is automatically release from the buffer on to the data out bus after a predefined number of clock cycles. In this embodiment, the number of cycles for holding each set of data is determined by the processor and sent within the read request. The number may be calculated as: the number of cycles for the previous data to be issued to the data out bus+1. The additional 1 cycle provides a barrier to switching noise and prevents overlap on the data bus. This allows the data to be issued on the data out bus in a pre-selected order and/or within a number of clock cycles of each other. The pre-selected order may be overridden by transmitting a release or hold signal prior to release of data from a particular buffer. Thus, data out bus utilization may be efficiently maximized.

The invention issues reads when they are received and do not wait for a previously issued read to clear the data out bus. The reads are issued at the same time because each DRAM has an individual address bus and the issued data may be held in the buffers and issued without overlapping each other. The invention thus provides a mechanism that monitors when two or more DRAMS receive either simultaneous reads or whose issued data overlap on the data bus, and then withholds the issuance of the data from one or more of the DRAMs until an appropriate time to transmit the data without overlapping other data traveling on the data bus.

Thus, with speculatively issued read requests, data is in effect pre-fetched, albeit speculatively, and issued when the read request is determined to be correctly speculated. The processor signals the memory controller, which in turn generates the release signal and transmits the release signal to cause the DRAM (or the buffer) to release the data to the data bus.

Figure 4:
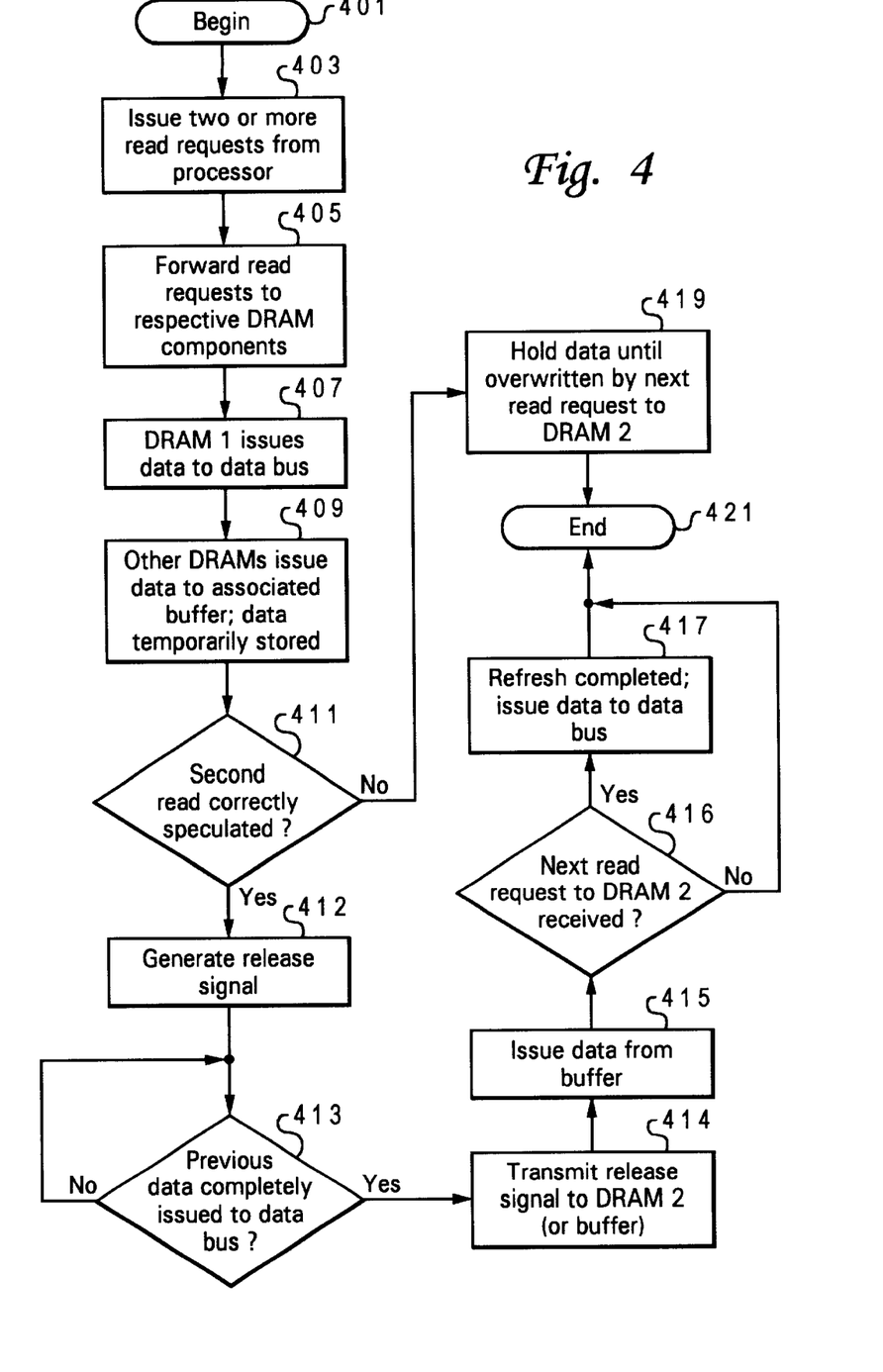
FIG. 4 is a flow chart of the process of operating a memory array according to the features provided by the present invention.

FIG. 4 is a flow chart illustrating the process of reading data from DRAM subsystem according to the methods of the invention. The process begins at block 401, and following a pair of read requests are issued by the processor as shown at block 403. The memory controller issues both read request to their respective DRAMs simultaneously as indicated at block 405. The DRAM receiving the first read request in the processing sequence issues the data on to the data out bus as indicated at block 407. Concurrently, the second DRAM issues its requested data to a buffer, which temporarily stores the data as provided at block 409. A determination is then made at block 411, whether the second read was correctly speculated.

If the read was correctly speculated, a signal is generated from the memory controller at block 412. A determination is then made at block 413 whether all of the previously issued data has been issued to the data out bus. When all of the previously issued data has been issued, the release signal is transmitted to the buffer as shown at block 414. The signal causes the buffer to release the data on to the data out bus as indicated at block 415. Following, a determination is made at block 416 whether the memory controller has received a next read request to the second DRAM. According to the invention, a subsequent read request to the second DRAM is immediately processed by the DRAM because the array has had time to refresh while the above processes were completed. The second DRAM thus issues the next set of data directly on to the data out bus as shown at block 417.

Returning to block 411, if the second read was incorrectly speculated, no signal is sent and the data remains in the buffer until it is overwritten by data from a next speculative read as shown at block 419. The process then ends as indicated at block 421. When multiple reads are issued, the invention operates to schedule access to the data bus by sending signals to each DRAM to release data from respective buffers in a timed sequence that prevents overlap of data on the data bus while maximizing the use of the data bus.

Figure 5A:
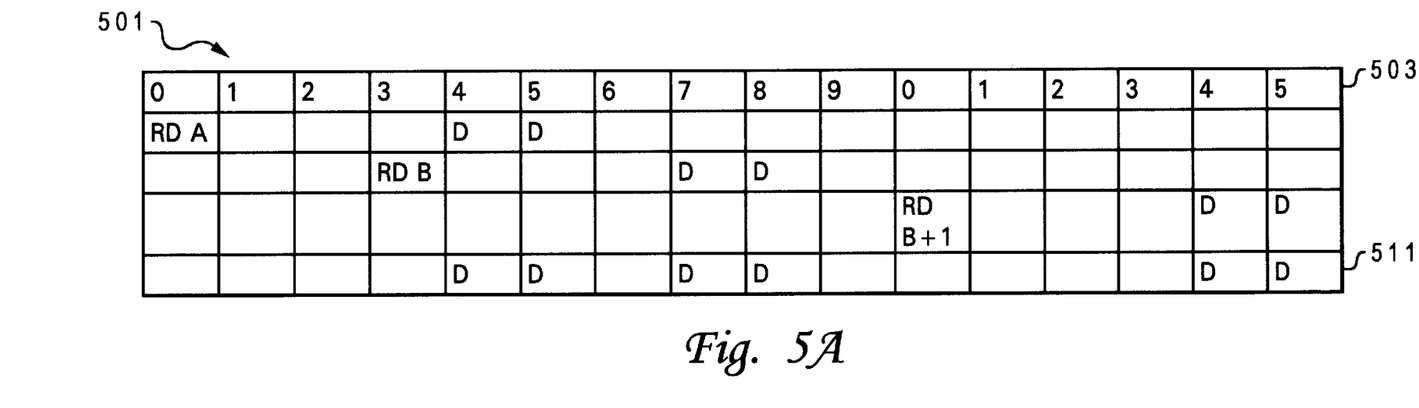
FIGS. 5A and 5B are timing diagrams illustrating the contrast between present operation of the memory array and operation according to the preferred embodiment of the present invention.
Figure 5B:
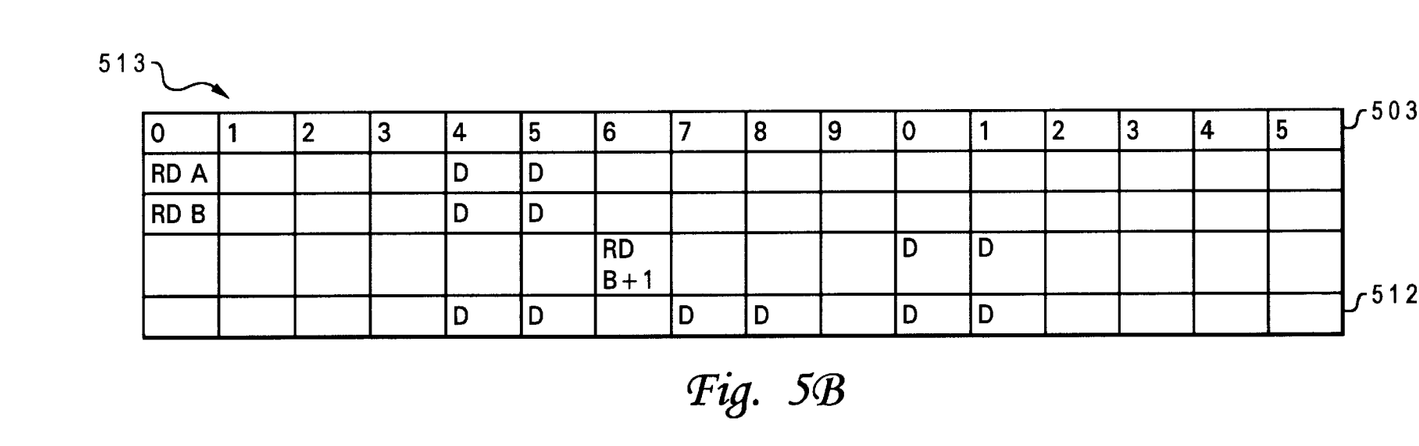

FIGS. 5A and 5B provide a set of timing diagrams for current DRAM operation and DRAM operation according to the present invention. During standard operation, a read command is followed several cycles later by the issuing of the data. Following, DRAM cell is pre-charged before it can receive another read command.

Each timing diagram tracks processor clock cycles 503. The first three rows track the read request and issuing of corresponding data from the DRAM (A or B). Data is assumed to begin issuing on to the data bus three (3) clock cycles after the read request is sent to the DRAM. The final row illustrates the relative timing of data issuance on the data bus. As represented in timing diagram 501, read request A issued to DRAM A is followed two cycles later by a read request B issued to DRAM B. Data from read request A is issued on the data out bus followed by a space of a processor clock cycle, and then the data of read request B is issued. Read B+1 request is then not sent to DRAM B until seven cycles after the Read B because it has to wait until DRAM B completes its pre-charge operation of two cycles.

In timing diagram 513, in contrast, both of the first two reads are allowed to proceed simultaneously. The data from the read request A and from the read request B are issued at the same time; however data from read request B is held in a buffer for two cycles before it is issued on the data out bus. This allows the data from read request A to complete issuing on the data out bus. Because the read request B was issued earlier than before, i.e., simultaneously with the read request A, the DRAM B completes its pre-charge operation at an earlier clock cycle and is thus able to process read B+1 command four clock cycles earlier. Then, accordingly, the data from each of the three reads can be issued on the data bus with a minimum number of clock cycles separating them to reduce switching noise on the bus. Therefore, a more efficient utilization of the data out bus is achieved.

The invention allows requests to be sent early to memory thus reducing system latency on the memory access without sacrificing memory data bus bandwidth if the command is canceled. The mechanism allows multiple request to run in parallel, freeing up the DRAM earlier for future requests and thereby allowing the memory controller better control in scheduling data to the common data bus. The overall effect is that the overall system data bus utilization is increased.

While the invention has been particularly shown and described with reference to a preferred embodiment, it will be understood by those skilled in the art that various changes in form and detail may be made therein without departing from the spirit and scope of the invention.

What is claimed is:

1. A memory subsystem of a data processing system comprising:
   a memory controller;
   a memory device coupled to said memory controller comprising at least a first memory component and a second memory component, wherein each of said first and second memory components are coupled to said memory controller via individual address buses;
   a shared data bus coupled to each of said first and second memory components;
   a buffer associated with at least said second memory component; and
   logic associated with said memory controller and buffer that controls an issuance of first data and second data from said first and said second memory component, respectively, wherein when said second data are issued at a time when said second data would overlap with said first data on said shared data bus, said second data is held in said buffer, while said first data is forwarded to said shared data bus.

2. The memory subsystem of claim 1, wherein said buffer holds said second data until said first data completes issuing on said shared data bus.

3. The memory subsystem of claim 1, wherein:
   said memory controller generates a release signal that releases said second data from said buffer; and
   said release signal is transmitted to said second memory component when said first data is completed issuing on said shared data bus.

4. The memory subsystem of claim 1, wherein said buffer is a shared buffer for said first memory component and said second memory component.

5. The memory subsystem of claim 4, wherein:
   said memory controller generates a release signal that releases said second data from said buffer; and
   said release signal is transmitted to said buffer when said first data is completed issuing on said shared data bus.

6. The memory subsystem of claim 5, wherein said first memory component and said second memory component are DRAMs.

7. The memory subsystem of claim 1, wherein said memory controller issues a first read request to said first memory component and issues a second read request to said second memory component, wherein said second read request comprises a hold bit that directs said second memory component to place said second data into said buffer.

8. The memory subsystem of claim 1, wherein said second data is automatically issued out of said buffer after a pre-determine number of clock cycles, wherein said predetermined number corresponds to one clock cycle more than a number of clock cycles required to complete issuing said first data on to said shared data bus.

9. The memory subsystem of claim 1, further comprising a second buffer, wherein said buffer is a component part of said second memory component and said second buffer is a component part of said first memory component.

10. A computer system comprising:
    a processor; and
    a memory subsystem coupled to said processor via an interconnect, wherein said memory subsystem holds speculatively read data in a buffer and issues said speculatively read data to a data bus only when a previously issued data has completed issuing on said data bus, whereby no overlap of data occurs on said data bus.

11. The computer system of claim 10, wherein further said memory subsystem holds said speculatively read data in said buffer until a read request that issues said speculatively issued data is determined to be correctly speculated.

12. The computer system of claim 10, wherein said memory subsystem comprises:
    a memory controller;
    a memory device coupled to said memory controller comprising at least a first memory component and a second memory component, wherein each of said first and second memory components are coupled to said memory controller via individual address buses;
    a shared data bus coupled to each of said first and second memory components;
    a buffer associated with at least said second memory component; and
    logic associated with said memory controller and buffer that controls an issuance of first data and second data from said first and said second memory component, respectively, wherein when said second data are issued at a time when said second data would overlap with said first data on said shared data bus, said second data is held in said buffer, while said first data is forwarded to said shared data bus.

13. The computer system of claim 12, wherein said buffer holds said second data until said first data completes issuing on said shared data bus.

14. The computer system of claim 13, wherein further said buffer holds said second data for a predetermined number of clock cycles.

15. The computer system of claim 13, wherein said buffer releases said second data to said data out bus only when a release signal is received from said memory controller.

16. The computer system of claim 15, wherein:
said memory controller generates a release signal that releases said second data from said buffer; and
said release signal is transmitted to said second memory component when said first data is completed issuing on said shared data bus.

17. The computer system of claim 12, wherein said buffer is a shared buffer for said first memory component and said second memory component.

18. The computer system of claim 17, wherein:
said memory controller generates a release signal that releases said second data from said buffer; and
said release signal is transmitted to said buffer when said first data is completed issuing on said shared data bus.

19. The computer system of claim 18, wherein said first memory component and said second memory component are DRAMs.

20. The computer system of claim 12, wherein said memory controller issues a first read request to said first memory component and issues a second read request to said second memory component, wherein said second read request comprises a hold bit that directs said second memory component to place said second data into said buffer.

21. The computer system of claim 12, wherein said second data is automatically issued out of said buffer after a predetermine number of clock cycles, wherein said predetermined number corresponds to one clock cycle more than a number of clock cycles required to complete issuing said first data on to said shared data bus.

22. The computer system of claim 12, further comprising a second buffer, wherein said buffer is a component part of said second memory component and said second buffer is a component part of said first memory component.

23. A method for improved operability of a memory subsystem comprising:
issuing two or more read request at an overlapping time period, each to a different memory component within said memory subsystem;
issuing a first data associated with one of said two or more read request to a data bus coupled to said memory components;
delaying an issuance to said data bus of a second data associated with a next one of said two or more read request, wherein no overlap occurs on said data bus between an issuance of said first data and an issuance of said second data.

24. The method of claim 23, wherein said delaying step includes placing said second data in a buffer associated with a memory component to which said next read request is addressed.

25. The method of claim 24, further comprising issuing said second data at predetermined later time.

26. The method of claim 25, wherein said issuing step includes:
generating a release signal that causes said buffer to release said second data to said data bus; and
transmitting said release signal to said memory component.

27. The method of claim 26, further comprising:
issuing said next read requests to said memory components prior to a completion of a system snoop operation; and
transmitting said release signal only when said next read request is correctly speculated.

28. The method of claim 23, wherein said issuing step includes modifying said next read request, wherein said next read request triggers a placement of said second data in to said buffer.

29. The method of claim 23, further comprising:
immediately issuing a read request that arrives at said memory controller;
monitoring when two or more memory components are sent a read request that causes an overlap in issued data on the data bus; and
placing data of later sequential reads in said buffer, until said first data is issued.

30. The method of claim 23, wherein said overlapping time periods corresponds to an issue time for data of a first read request that overlaps with a second issue time for data of a second read request on said data bus.

31. A method for controlling allocation of a data bus to speculatively issued data comprising:
issuing a speculative read command to a memory component as soon as said speculative read command is received at a memory controller;
holding data issued by said speculative read command in a buffer;
transmitting said issued data to said data bus only when said read command is determined to be correctly speculated and when previously issued data from another memory component has completed issuing on said data bus, wherein overlap of data on said data bus is substantially eliminated.

32. The method of claim 31, further comprising:
generating a release signal that releases said issued data from said buffer on to said data bus; and
responsive to a determination that said read command was correctly speculated, forwarding said release signal to said memory component.

33. The method of claim 31, wherein said transmitting step further comprises first determining that a previously issued data from another memory component has completed issuing on said data bus, wherein overlap of data on said data bus is substantially eliminated.

* * * * *